United States Patent [19]
Reynolds et al.

[11] Patent Number: 5,941,590
[45] Date of Patent: *Aug. 24, 1999

[54] TRIM PANEL WITH 180 DEGREE PERIPHERY EDGE WRAP

[75] Inventors: Christopher Reynolds, Oxford, Mich.; Anthony J. Link, North Liberty, Iowa

[73] Assignee: Chrysler Corporation, Auburn Hills, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/691,726

[22] Filed: Aug. 2, 1996

[51] Int. Cl.6 .................................................. B62D 25/00
[52] U.S. Cl. ............................................................ 296/39.1
[58] Field of Search ............................. 296/39.1, 146.7, 296/70; 180/90

[56] References Cited

U.S. PATENT DOCUMENTS

| 4,214,788 | 7/1980 | Srock ...................................... 296/39.1 |
| 4,402,118 | 9/1983 | Benedetti . |
| 5,224,299 | 7/1993 | Abe ..................................... 296/39.1 X |
| 5,294,164 | 3/1994 | Shimabara et al. . |
| 5,304,273 | 4/1994 | Kenrick et al. . |
| 5,362,572 | 11/1994 | Hamada et al. . |
| 5,580,116 | 12/1996 | Patel et al. ............................. 396/39.1 |
| 5,695,865 | 12/1997 | Shimizu ........................... 296/146.7 X |

*Primary Examiner*—Joseph D. Pape
*Attorney, Agent, or Firm*—Lawrence J. Shurupoff

[57] ABSTRACT

A trim panel with a periphery edge wrap including a trim panel substrate having a periphery edge and a trim panel cover wrapped approximately one hundred eighty degrees about the periphery edge of the trim panel substrate.

6 Claims, 2 Drawing Sheets

TRIM PANEL WITH 180 DEGREE PERIPHERY EDGE WRAP

BACKGROUND OF THE INVENTION

1. Field of the Invention

The present invention relates generally to trim panels for motor vehicles and, more particularly, to a trim panel with 180° periphery edge wrap for a motor vehicle.

2. Description of the Related Art

Trim panels are used in occupant compartments of motor vehicles. For example, a vehicle body may include a quarter panel having an inner panel and outer panel joined to each other and connected to a vehicle structure in a known manner. The quarter panel also includes a decorative trim panel mounted on the inner panel.

As illustrated in FIGS. 1 and 2, a trim panel 10 includes a trim panel substrate 12 and a trim panel cover 14 disposed over a portion of the trim panel substrate 12. The trim panel substrate 12 is made of a glass reinforced urethane foam and the trim panel cover 14 is made of a thin layer of vinyl.

For a convertible type motor vehicle, the trim panel 10 has a periphery edge 16 on an upper portion of the trim panel substrate 12 for a topwell area of the vehicle. This periphery edge 16 is visible or exposed when a top of the convertible type motor vehicle is in a down position and is undesired.

Typically, a mold 18 is used to manufacture the trim panel 10. The trim panel cover 14 is placed in a cavity 20 of the mold 18 and disposed over a mold ring 22. A vacuum is applied to form the trim panel cover 14 to a predetermined shape. The urethane foam material is then injected against an inner surface of the trim panel cover 14 and a core 24 of the mold 18 to form the trim panel substrate 12. As a result, the trim panel cover 14 is only wrapped on two surfaces of the periphery edge 16 of the trim panel substrate 12, approximately ninety degrees. Thus, there is a need in the art to provide a trim panel with a periphery edge wrap having a superior fit and finish.

SUMMARY OF THE INVENTION

It is, therefore, one object of the present invention to provide a trim panel with a periphery edge wrap of approximately one hundred eighty degrees (180°).

It is another object of the present invention to provide a trim panel with a wrapped periphery edge in a topwell area thereof for a convertible type motor vehicle.

To achieve the foregoing objects, the present invention provides a trim panel with a 180° periphery edge wrap. The trim panel includes a trim panel substrate having a periphery edge and a trim panel cover. The trim panel cover is wrapped approximately one hundred eighty degrees about the periphery edge of the trim panel substrate.

One advantage of the present invention is that a trim panel is provided with a periphery edge wrap extended to three visible surfaces or approximately one hundred eighty degrees. Another advantage of the present invention is that a quarter trim panel is provided having a periphery edge wrap in a topwell area thereof for a convertible type motor vehicle. Yet another advantage of the present invention is that a blade is attached to loose mold piece(s), creating an undercut or step for the trim panel cover. Still another advantage of the present invention is that the trim panel has an edge wrap extended to three visible surfaces, providing a superior fit/finish and appearance thereof.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
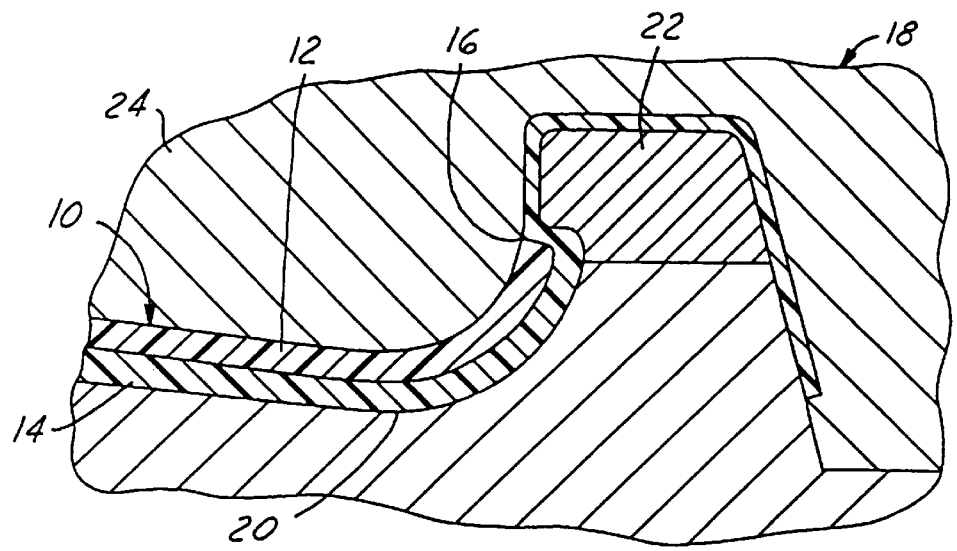
FIG. 1 is a cross-sectional fragmentary view of a prior art trim panel with a ninety degree periphery edge wrap illustrated in operational relationship with a mold.
Figure 2:
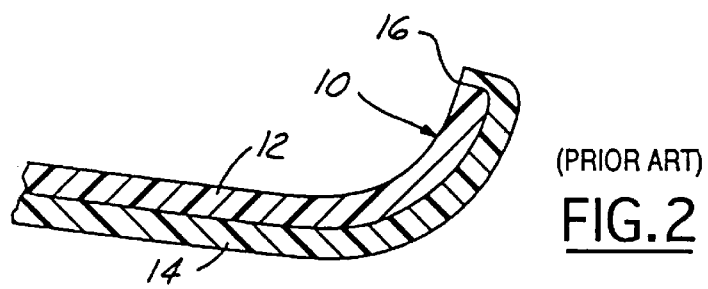
FIG. 2 is a cross-sectional fragmentary view of the prior art trim panel of FIG. 1.
Figure 3:
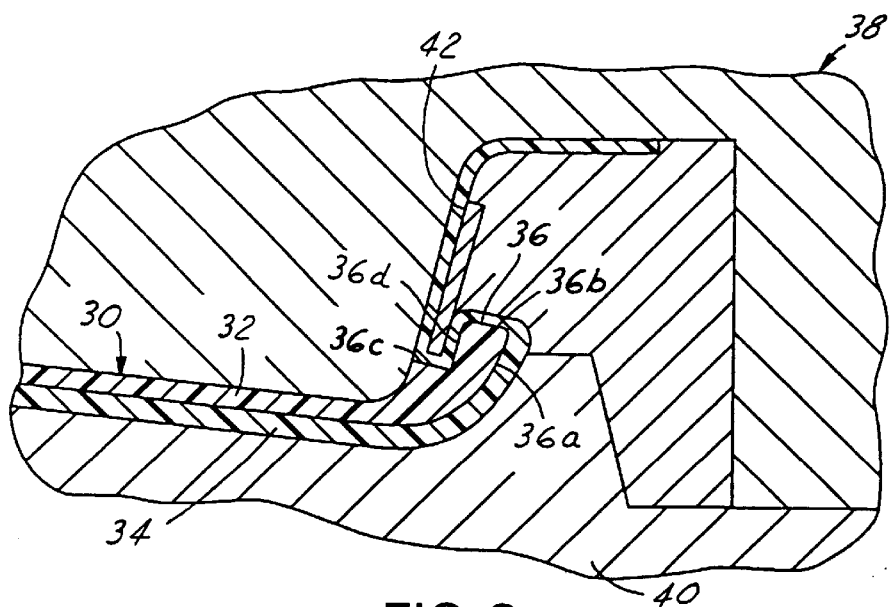
FIG. 3 is a cross-sectional fragmentary view of a trim panel with a one hundred eighty degree periphery edge wrap, according to the present invention, illustrated in operational relationship with a mold.
Figure 4:
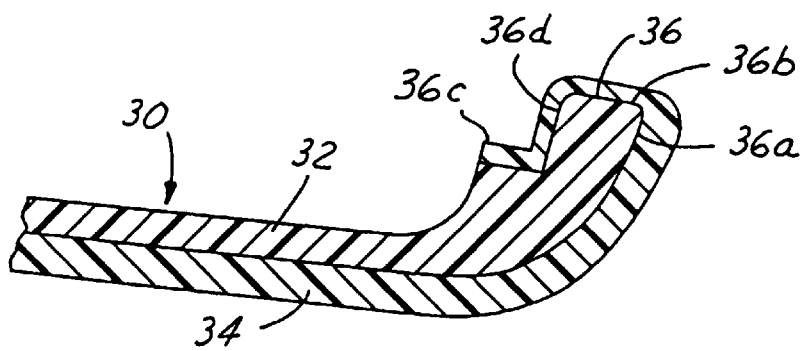
FIG. 4 is a cross-sectional fragmentary view of the trim panel of FIG. 3.

Referring to FIGS. 3 and 4, a trim panel 30, according to the present invention, for use in an occupant compartment (not shown) of a motor vehicle (not shown) such as a convertible type motor vehicle is shown. Preferably, the trim panel 30 is a trim panel for a quarter panel of the motor vehicle.

As shown in FIG. 4, the trim panel 30 includes a relatively thin trim panel substrate 32 extending vertically and longitudinally. In use, the trim panel 30 is attached to the quarter panel (not shown) by suitable means such as fasteners (not shown). The trim panel substrate is made of a suitable foam material such as a glass reinforced urethane foam. The trim panel 30 also includes a relatively thin trim panel cover 34 extending vertically and longitudinally and covering the outer surface of the trim panel substrate. The trim panel cover 34 is disposed adjacent the trim panel substrate 32 and attached thereto. The trim panel cover 34 is made of a suitable material such as a relatively lightweight, soft, thin layer of vinyl or the like. Preferably, the trim panel cover 34 is a die cut pad formed by conventional rule cutting as is known in the art.

The trim panel substrate 32 includes a periphery edge 36. The periphery edge 36 includes an outer side 36a and an opposed inner side 36d. The opposed inner 36a and outer 36d sides are interconnected by an upper end 36b. The periphery edge 36 also includes a lower end 36c connected to the inner side 36d and extending away from both the inner out outer sides and forming a step or undercut in the inner side of the periphery edge. The trim panel cover 34 is wrapped about the periphery edge 36 such that it extends over at least three surfaces, i.e., the outer side 36a, the upper end 36b, and the inner side 36d. As seen in FIG. 4, the trim panel cover terminates at the step formed between the inner side 36d and the lower end 36c.

As illustrated, the trim panel cover 34 extends along the outer side 36a. Upon reaching the upper end 36b the trim panel cover 34 turns or folds approximately ninety degrees and continues along the upper end 36b. Upon reaching the intersection of the upper end 36b and the inner side 36d, the trim panel cover 34 takes a second turn of approximately ninety degrees and continues along the inner side 36d. Upon reaching the intersection of the inner side 36d and the lower end 36c the trim panel cover 34 again turns approximately ninety degrees to cover the surface of the lower end 36c.

It should be appreciated that the trim panel cover 34 is wrapped approximately one hundred eighty degrees about the periphery edge 36 of the trim panel substrate 32; i.e., the trim panel cover 34 is attached to the upper end 36*b* as well as the inner side 36*d* along with the outer side 36*a*. While the trim panel 10 of the present invention is shown in use with a substantial rectangular periphery edge 36, the periphery 36 could also be circular in cross-section and thus the one hundred and eighty degree wrap would also apply, in that a semi-circle covers one hundred and eighty degrees.

Figure 5:
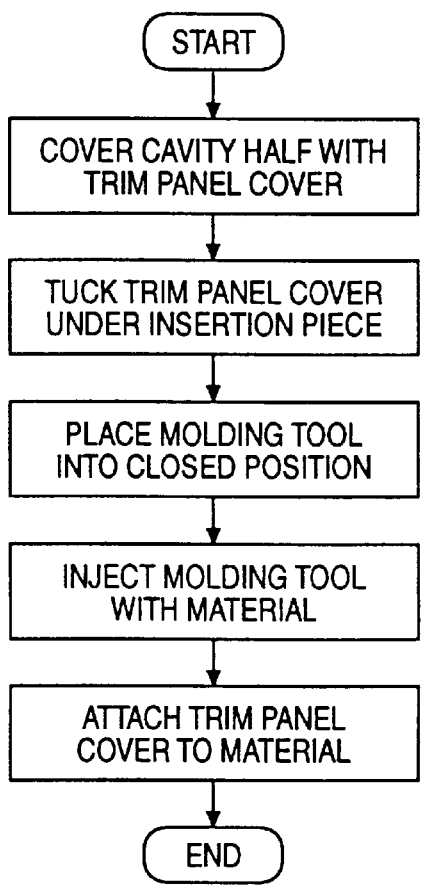
FIG. 5 is a flowchart of a method for making the trim panel of FIGS. 3 and 4.

A method of forming the trim panel 30 according to the present invention, is disclosed in FIG. 5. The method includes the steps of providing a trim panel cover 34 formed from a die cut pad of vinyl material. The method includes placing the trim panel cover 34 in a molding tool, generally indicated at 38, by covering a lower or cavity half 40 with the trim panel cover 34. The method includes the steps of placing a loose piece or form block 41 having a blade 42 thereon in the mold tool 38 and placing the molding tool 38 into a closed position. The method further includes the steps of molding a trim panel substrate 32 against the trim panel cover 34 by injecting a urethane foam material against an inner surface of the trim panel cover 34 to form the trim panel substrate 32.

It should be appreciated that such an apparatus provides a trim panel 30 having periphery edge 36 which is covered by a trim panel cover 34.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A trim panel with a periphery edge wrap comprising:

a trim panel substrate having an outer surface and a periphery edge consisting of a foam material and comprising inner and outer side portions interconnected by an upper end portion, and a lower end portion extending from said inner side portion so as to form a step in said inner side portion of said periphery edge; and a trim panel cover extending along and contacting said outer surface of said trim panel substrate and wrapped approximately one hundred eighty degrees about said periphery edge of said trim panel substrate so as to contact said inner and outer side portions, said upper end portion and said lower end portion of said periphery edge.

2. A trim panel as set forth in claim 1 wherein said trim panel cover is made of a relatively soft material.

3. A trim panel as set forth in claim 1 wherein said trim panel substrate is made of a foam material.

4. A trim panel as set forth in claim 1 wherein said trim panel cover terminates adjacent said step.

5. A trim panel with a periphery edge wrap comprising:

a trim panel substrate consisting of a foam material and having an outer surface and a periphery edge comprising inner and outer side portions interconnected by an upper end portion; and a trim panel cover extending along and contacting said outer surface of said trim panel substrate and wrapped approximately one hundred eighty degrees about said periphery edge of said trim panel substrate so as to contact said inner and outer side portions and said upper end portion of said periphery edge.

6. A trim panel with a periphery edge wrap comprising:

a trim panel substrate comprising a foam material and having an outer surface and a periphery edge comprising inner and outer side portions interconnected by an upper end portion; and a trim panel cover molded and bonded to said foam material over said outer surface of said trim panel substrate and molded and bonded to said foam material over approximately one hundred eighty degrees about said periphery edge of said trim panel substrate so as to contact said inner and outer side portions and said upper end portion of said periphery edge.

\* \* \* \* \*